US007970853B2

(12) United States Patent
Simpson

(10) Patent No.: US 7,970,853 B2
(45) Date of Patent: Jun. 28, 2011

(54) SYSTEM FOR CONTROLLED PRINTING OF A SIGNATURE USING WEB-BASED IMAGING

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2242 days.

(21) Appl. No.: 09/981,392

(22) Filed: Oct. 17, 2001

(65) Prior Publication Data

US 2003/0074396 A1 Apr. 17, 2003

(51) Int. Cl.
*G06F 15/16* (2006.01)

(52) U.S. Cl. ........................................ 709/217
(58) Field of Classification Search ............... 709/203, 709/206, 217; 715/500; 358/1
See application file for complete search history.

(56) References Cited

U.S. PATENT DOCUMENTS

| 5,367,621 | A | * | 11/1994 | Cohen et al. | 715/209 |
| 5,606,609 | A | * | 2/1997 | Houser et al. | 713/179 |
| 5,787,175 | A | * | 7/1998 | Carter | 713/165 |
| 5,819,295 | A | * | 10/1998 | Nakagawa et al. | 707/203 |
| 5,893,908 | A | * | 4/1999 | Cullen et al. | 707/5 |
| 6,009,442 | A | * | 12/1999 | Chen et al. | 715/522 |
| 6,038,601 | A | * | 3/2000 | Lambert et al. | 709/226 |
| 6,134,583 | A | * | 10/2000 | Herriot | 709/217 |
| 6,144,975 | A | * | 11/2000 | Harris et al. | 715/500 |
| 6,369,909 | B1 | * | 4/2002 | Shima | 358/1.15 |
| 6,438,584 | B1 | * | 8/2002 | Powers | 709/206 |
| 6,584,466 | B1 | * | 6/2003 | Serbinis et al. | 707/10 |
| 6,615,234 | B1 | * | 9/2003 | Adamske et al. | 709/203 |
| 6,631,200 | B1 | * | 10/2003 | Savoray et al. | 382/119 |
| 6,741,743 | B2 | * | 5/2004 | Stalcup et al. | 382/217 |
| 6,757,071 | B1 | * | 6/2004 | Goodman et al. | 358/1.13 |
| 2002/0067500 | A1 | * | 6/2002 | Yokomizo et al. | 358/1.15 |
| 2002/0114013 | A1 | * | 8/2002 | Hyakutake et al. | 358/3.28 |
| 2003/0063744 | A1 | * | 4/2003 | Parry | 380/51 |

FOREIGN PATENT DOCUMENTS

WO WO 99/26181 5/1999

OTHER PUBLICATIONS

U.S. Appl. No. 09/712,336, filed Nov. 13, 2000, Shell S. Simpson.
U.S. Appl. No. 09/874,184, filed Jun. 4, 2001, Shell S. Simpson.
U.S. Appl. No. 09/874,427, filed Jun. 4, 2001, Shell S. Simpson.
U.S. Appl. No. 09/924,058, filed Aug. 8, 2001, Shell S, Simpson.

\* cited by examiner

*Primary Examiner* — Wing F Chan
*Assistant Examiner* — Alicia Baturay

(57) ABSTRACT

A controlled image including a predetermined graphic symbol, for example a signature on a check or other document, is produced in a web-based imaging environment. From a client program, for example a user's browser, a source service is accessed and dynamically generates under interactive control of the client program a printable version of the controlled image including the predetermined graphic symbol, which references a particular symbol set, for example a font. The printable version is referenced from a composition associated with a user's identity, e.g., an imaging store. A destination service representing a production device is accessed from the client program and then retrieves the printable version. Only if the destination service contains the particular symbol set will the controlled image be produced including the signature or other predetermined graphic symbol. Otherwise the image can be optionally produced including a substitute symbol, e.g., "VOID."

46 Claims, 6 Drawing Sheets

SYSTEM FOR CONTROLLED PRINTING OF A SIGNATURE USING WEB-BASED IMAGING

RELATED APPLICATIONS

The present application is related to co-pending and commonly assigned U.S. patent application Ser. No. 09/712,336 entitled "SYSTEM AND METHOD FOR PROCESSING DATA IN A DISTRIBUTED ENVIRONMENT," filed Nov. 13, 2000; co-pending and commonly assigned U.S. patent application Ser. No. 09/874,184 entitled "SYSTEM AND METHOD FOR PRINTING FROM A WEB APPLICATION," filed Jun. 4, 2001; co-pending and commonly assigned U.S. patent application Ser. No. 09/874,427 entitled "DYNAMIC PRODUCTION DEVICE REPRESENTATION IN A DISTRIBUTED ENVIRONMENT," filed Jun. 4, 2001; and co-pending and commonly assigned U.S. patent application Ser. No. 09/924,058 entitled "SYSTEM AND METHOD AND PROGRAM PRODUCT FOR MULTIUSER PROFILE OPERATIONS AND GROUP COMPOSITION STORE" filed Aug. 8, 2001, the disclosures of which are all hereby incorporated herein by reference.

TECHNICAL FIELD

The invention relates to a system for printing of an image in a distributed computing environment, and more particularly to a system for controlled printing of a signature in a web-based imaging environment.

BACKGROUND

Prior art methods exist for controlled printing of signatures or related symbols, such that the image of the signature is not revealed except by printing or display of the signature at an appropriate printing or other final destination device. Existing methods use a signature font, characters from which are embedded by a special application, which are printed to devices using operating system specific drivers. These methods are cumbersome and inflexible in a network printing environment. Needed are more flexible and efficient improved methods for controlled printing of signatures and related predetermined graphic symbols in a distributed computing environment.

SUMMARY OF THE INVENTION

The present invention is directed to a system and method for printing, producing, and/or displaying in a distributed computing environment, such as a network, of a controlled image including a predetermined graphic symbol, for example a signature on a check or other document. From a client program, for example a user's browser, a source service is accessed and dynamically generates under interactive control of the client program a printable version of the controlled image including the predetermined graphic symbol, which references a particular symbol set, for example a font. The printable version is referenced from a composition associated with a user's identity, e.g., an imaging store. A destination service representing a production device is accessed from the client program and then retrieves the printable version. Only if the destination service contains the particular symbol set will the controlled image be produced including the signature or other predetermined graphic symbol. Otherwise the image can be produced optionally through a substitute symbol set, such as one which generates the word "VOID."

In some embodiments of the present invention, an accessed destination service requests a preview version of the image from the imaging store, and provides an executable content that is displayed at the client program (browser) including user selectable options specific to the production service (e.g., printer) represented by the accessed destination service and a dynamically changing image of the preview version in the context of the capabilities specific to the production device as selected by the user through the content provided in the browser display. In the latter case, if the accessed destination service does not contain the predetermined symbol set, the displayed or printed image cannot include the controlled signature but can instead display a "VOID" message. If the accessed destination service is an appropriate destination service containing the predetermined symbol set, the controlled signature can be displayed. Alternatively, the appropriate destination service can either display the printable image without the controlled signature, or a "VOID" message, or a recognizable proxy symbol signifying the presence of the predetermined symbol set without revealing the actual signature.

GLOSSARY OF TERMS AND ACRONYMS

Figure 1A:
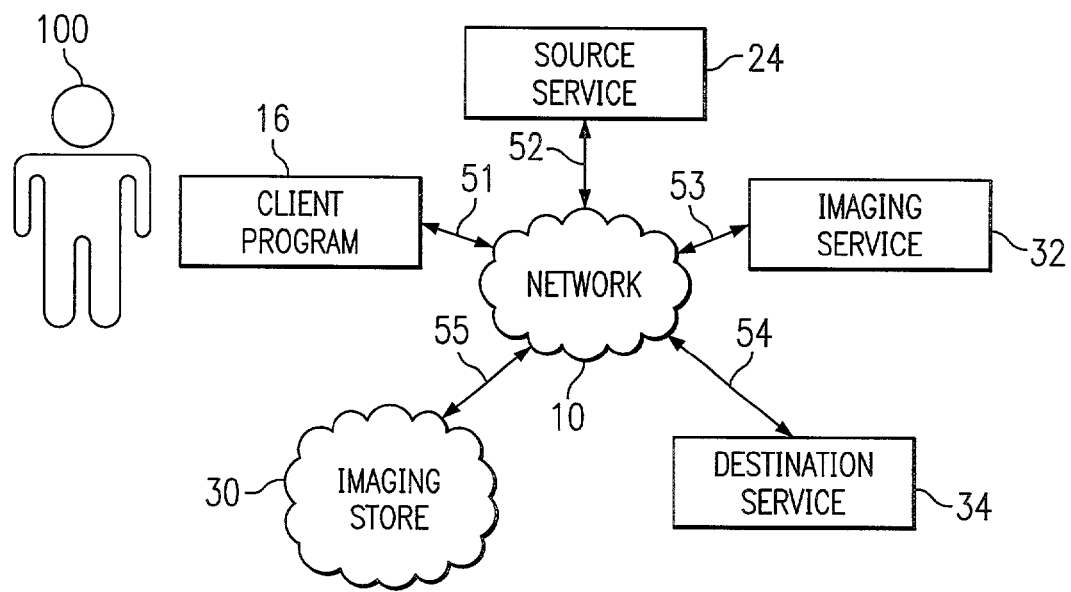
FIG. 1A is a simplified schematic diagram representing a logical overview of a typical web-based imaging system, in accordance with embodiments of the present invention.

The following terms and acronyms are used throughout the Detailed Description:

"API". An application programming interface (API) is a library of programmatic methods provided by a system of some kind (an example is a web-based imaging system, as in the present invention) that enables client programs (web application content operating within the browser is one example) to interact with that system. One method of creating an API is to create a library. For example, in JAVA™, a library (conventionally called a jar file) is created by defining a class or classes, compiling the class or classes, and grouping the class or classes into a library. For example, the following class could be created:

class BaseConversionAPI {static public String convert-BaseToBase (String in Number, int inBase, int outBase) {// Code for returning a string representing inNumber converted to outBase}}

That class would then be compiled with the command:
java.exe BaseConversionAPI.java NOTE: Programs are typically stored in text files, which are "compiled" in order to create "object files" which contain the executable (or interpretable) instructions. In this case, the program is contained in the file BaseConversionAPI.java. The act of compiling creates a file named "BaseConversionAPI.class" containing instructions for a specific computing architecture (in this case the JAVA™ Virtual Machine) corresponding to the program.

Next in this example, a Jar file would be created:
jar.exe cvf BaseConversionAPI.tar BaseConversionAPI.class This command creates a "library" file containing the BaseConversionAPI class. This last step is not absolutely required. In some instances, API's are provided as simply files containing executable instructions (such as the BaseConversionAPI.class file).

References regarding the creation of API's:
http://www.library.yale.edu/orbis2/public/activity/AP.html Note that the API's to network services (graphic store, composition store, and user profile store, all to be discussed below) would be created to be accessible through a remote invocation technology such as CORBA, JAVA™-RMI, DCOM™, RPC, or SOAP. A wide variety of references are available that describe how API's can be created to be accessible through a remote invocation technology, such as one of the technologies noted above.

"Client-Server". A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

"Composition." Composition, also referred to as a "graphics composition," comprises a file with links to graphic data serviced as a single unit, i.e., a graphic. The file also usually includes information on the placement of those graphics on a sequence of canvases. It describes how to combine one or more graphics from one or more sources onto a sequence of canvasses, in a variety of different ways. The use of compositions allows multiple compositions to reference a graphic in a graphic store without having to duplicate the graphic.

"Composition store". Composition store refers to a service (ideally implemented as a network service) that stores and provides access to imaging composition(s) that can be accessed by the user or web services. In this context, providing "access" includes providing methods for building compositions, modifying compositions, and accessing them piecemeal. For example, a set of methods available for execution via the composition store might include the methods Get a Composition, Create a Composition, Delete a Composition, and Modify a Composition.

"Content." A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, JAVA™ applet, JavaScript™ and C-"Sharp" code.

"Exchange infrastructure." An exchange infrastructure is a collection of services distributed throughout a network that store imaging data associated with a particular user through a user profile.

"Firewall." A firewall filters out unwanted communication packets in one or more directions. By way of example, in one implementation of a firewall, requests from inside a firewall may be made to access data on the outside of the firewall, and responses to such requests are typically permitted. Communications initiated from outside the firewall to devices inside of the firewall are typically not permitted. Generally, the firewall may be implemented by a firewall proxy server that allows devices inside the firewall to pass HTTP requests to web servers outside the firewall. Obviously, other protocols may be used to implement communication through the firewall.

"Generic access instructions." A generic access instruction refers to an executable instruction that is intended to cause the executing device to generate generic access requests in order to access a set of target graphic data. These instructions call methods provided by, for example, an imaging extension, but are executing within a JVM/JAVA™ or similar environment (which the imaging extension is part of). Methods provided by the environment in which the program is executed are typically called an "Application Programming Interface" (API). Note that a generic access instruction does not include the location of the target graphic data. Typically, the target graphic data is pre-selected (generally by a user) and its location is determined from information that is maintained locally within the executing device.

For purposes of this application, the term "generic access instruction" refers to an executable instruction that is intended to cause the executing device to generate generic access requests in order to access a set of target data. A generic access instruction, however, does not include the location of the target data itself and neither does the generic access requests. Importantly, the target data is pre-selected (typically by a user) and its location is determined from information that is maintained locally within the executing computer or otherwise associated with the user. For this reason, the target data for a particular computer is said to be "associated" with that computer or more specifically with that user. Thus, for example, the target data that is associated with computer "A" is the data that computer "A" will access in response to a generic access instruction. The target data that is associated with computer "B" is the data that computer "B" will access in response to the identical generic access instruction.

Furthermore, in the case wherein the target data represents an image, that image is referred to herein as the "target image." In this simplified example, it will be assumed that all generic access instructions specified by the system wide standard mentioned above are for accessing data that describes an image.

"Graphic data." Graphic data refers to digital data capable of being represented as two dimensional graphics, such as a Portable Document Format ("PDF") file or a Joint Photographic Experts Group ("JPEG") file.

"Graphic store." Graphic store refers to a network service or a storage device for storing graphics data that can be accessed by the user or other network services. The graphic store preferably accepts the graphic data in multiple standard file formats, and the graphic data is converted into these file formats when necessary depending on the implementation.

"Hyperlink." A navigational link from one document to another, from one portion (or component) of a document to another, or to a Web resource, such as a JAVA™ applet.

Typically, a hyperlink is displayed as a highlighted word or phrase that can be selected by clicking on it using a mouse to jump to the associated document or document portion or to retrieve a particular resource.

"Hypertext System." A computer-based informational system in which documents (and possibly other types of data entities) are linked together via hyperlinks to form a user-navigable "web."

"HTML" (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see for example Ian S. Graham, The HTML Source Book, John Wiley and Sons, Inc., 1995 (ISBN 0471-11894-4).

"HTTP" (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

"Imaging composition." An imaging composition comprises links to imaging data serviced as a single unit.

"Imaging data." Imaging data refers to digital data capable of being represented as two dimensional graphics, such as a Portable Document Format ("PDF") file or a Joint Photographic Experts Group ("JPEG") file.

"Imaging data store." Imaging data store refers to a network service or a storage device for storing imaging data that can be accessed by the user or other network services. The imaging data store preferably accepts the imaging data in multiple standard file formats, and the imaging data is converted into these file formats when necessary depending on the implementation.

"Internet." A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

"PDA" (Personal Digital Assistant). A small hand-held computer used, for example, to write notes, track appointments, send email and browse the web with generally with far less storage capacity than a desktop computer.

"Personal imaging repository." A personal imaging repository is a conceptual term describing the exchange infrastructure used to exchange graphics composition and graphics data with web services. Users are associated with their graphics data through user profiles. It should be noted that the personal imaging repository 50 can represent any type or combination of data storage devices.

"URL" (Uniform Resource Locator). A unique address which fully specifies the location of a file or other resource on the Internet or a network. The general format of a URL is protocol: //machine address: port/path/filename.

"User Information." User information is identification and security information used in accessing graphics composition (s) and graphics data associated with a particular user profile. It is preferably accessed either directly or indirectly through methods provided by an extension component integrated into the web browser.

"User Interface." The junction between a user and a computer program providing commands or menus through which a user communicates with a program. For example, in the client-server model defined above, the server usually generates and delivers to a client a user interface for communicating with a program operating on or controlled by the server device. Where the server is a web server, the user interface is a web page. The web page when displayed by the client device presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

"World Wide Web" ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass WAP and WML for mobile phone web browsers, as well as other current and future markup languages and transport protocols which may be used in place of (or in addition to) HTML and HTTP.

"Web Site." A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

"Web service." A web service is intended to refer to a service that is provided (at least in part) by a web server. But a web service is a broader concept than a web server. In this regard, a "Web server" is a program that, using the client/server model and the World Wide Web's Hypertext Transfer Protocol (Hypertext Transfer Protocol), serves the files that form Web pages to Web users (whose computers contain HTTP clients that forward their requests). Every computer on the Internet that contains a Web site must have a Web server program. The most popular Web servers currently are Microsoft's Internet Information Server (Internet Information Server), which comes with the Windows NT server; Netscape FastTrack™ and Enterprise™ servers; and Apache, a Web server for UNIX-based operating systems. Other Web servers include Novell's Web Server for users of its Net- Ware™ operating system and IBM's family of Lotus Domino servers, primarily for IBM's OS/390™ and AS/400™ customers.

Web servers often come as part of a larger package of Internet- and intranet-related programs for serving e-mail, downloading requests for File Transfer Protocol files, and building and publishing Web pages. This larger package is referred to as the web service. Parameters for a Web server include how well it works with various operating systems and other servers, its ability to handle server-side programming, and publishing, search engines, and site building tools in the package.

DETAILED DESCRIPTION

FIG. 1A is a simplified schematic diagram representing a logical overview of a typical web-based imaging system, in accordance with embodiments of the present invention. User 100 interfaces with client program 16, typically a web browser, which is logically connected through data path 51 with network 10. Also logically connected with network 10 through respective data paths 52-55 are for example among other entities source service 24, an imaging service 32, destination service 34, and imaging store 30 (for further description of a source service, a destination service, and an imaging store see co-pending and commonly assigned U.S. patent application Ser. Nos. 09/712,336, 09/874,184, 09/874,427, and 09/924,058, cited above, the disclosures of which have been incorporated herein by reference). Network 10 can be any of a variety of network types, including for example Internet, Intranet, and Ethernet, and the transmission medium of network 10 and data paths 51-55 can include electrically conductive cable, optical fiber, semiconductor, wireless, or any combinations of these. Data paths 51-55 need not be physical links but can represent data flows through any media. In general a web-based imaging system can include multiple client programs 16, source services 24, destination services 34, and imaging stores 30 each interconnected with a network 10 and having a unique network address, typically represented by a Uniform Resource Locator (URL). Imaging service 32 is a logical entity providing client program 16 access to multiple destination services 34 by accessing and downloading interfaces, typically web pages conventionally generated using HyperText Markup Language (HTML) coding. Web documents are conventionally located and acquired throughout network 10 using HyperText Transfer Protocol (HTTP).

Figure 1B:
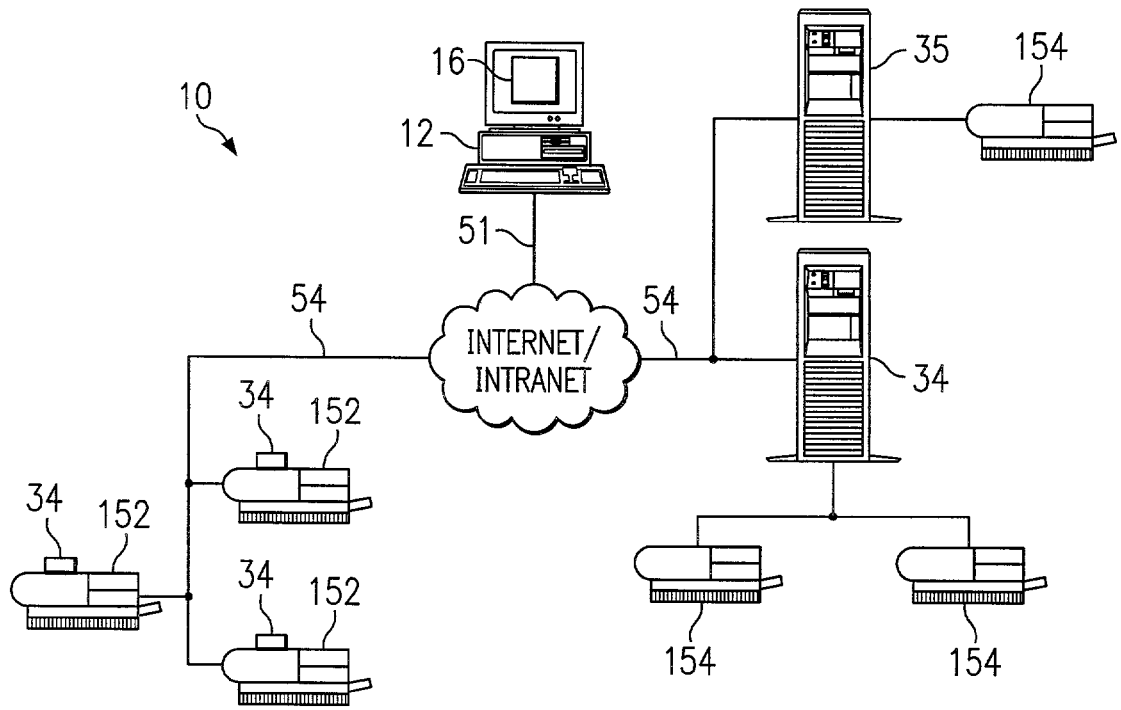
FIG. 1B is a simplified schematic diagram depicting various aspects of destination services, in accordance with embodiments of the present invention.

FIG. 1B is a simplified schematic diagram depicting various aspects of destination services 34, in accordance with embodiments of the present invention. A destination service 34 typically is a destination web service that represents one or more production devices 152, 154 on network 10. Production devices 152, 154 include printers; paper handling accessories such as binders, sorters, or folders; e-mail clients; facsimile devices; web servers; and data storage devices. Production devices are not, however, limited to those above, but may include any devices capable of electronically or physically saving, displaying, formatting, or transferring a target image. Some production devices perform a single type of service, for example printing, whereas other production devices perform multiple services. A self-representing production device 152 contains an embedded destination service 34, which represents production device 152 on network 10, allowing production device 152 to be connected directly to network 10 and accessed directly by client program 16. Client program 16 is typically a web browser that runs in a client machine 12, commonly a desktop or laptop and potentially a handheld computer or personal digital assistant (PDA). On the other hand, a production device 154 such as a conventional printer is incapable of self-representation and consequently must be connected to and controlled by an external destination service 34 running on an intermediate device such as a desktop computer or a print server machine.

In some embodiments of the present invention, source service 24 generates a set of data representing a printable version of a target image, which includes a controlled symbol referring to a predetermined symbol set. Only when the printable version of the target image is accessed by an appropriate destination service that contains the predetermined symbol set, for example appropriate destination service 35, can the controlled symbol in the target image be produced or displayed. Any other destination service 34 not containing the predetermined symbol set, including for example destination services accessible through imaging service 32, can print or display at most only a proxy symbol in place of the controlled symbol, when printing or displaying the image. The data representing the printable version of the target image are referenced by a composition stored in imaging store 30, as described in more detail below.

Figure 1C:
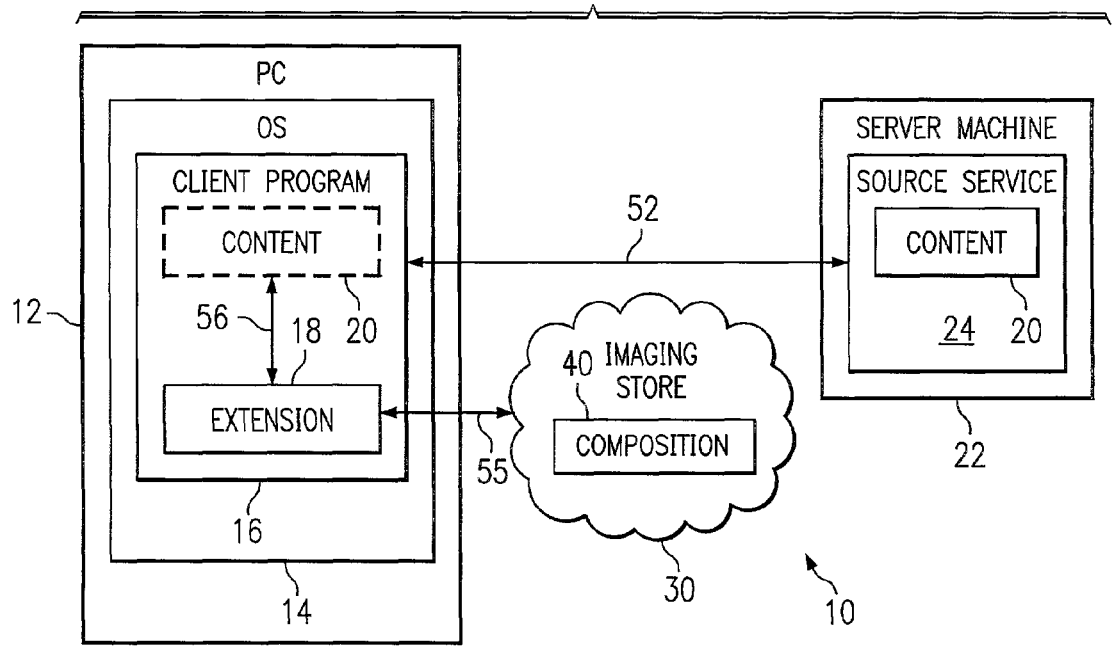
FIG. 1C is a schematic diagram illustrating in more detail various aspects of the network of FIG. 1A, in accordance with embodiments of the present invention.

FIG. 1C is a schematic diagram illustrating in more detail various aspects of network 10 of FIG. 1A, in accordance with embodiments of the present invention. Client program 16 running on operating system 14 in client machine 12 is logically interconnected through data path 52 of network 10 with source service 24, typically a source web service that runs on server machine 22 and generates interfaces, typically web content 20. When client program 16 browses to source service 24, web content 20, usually including executable content, is downloaded into the browser window of client program 16. Executable content 20 accesses imaging store 30 via application programming interfaces (APIs) contained in a modified imaging extension 18 of client program 16, for example through data paths 55 and 56. For further description of imaging extensions containing APIs see co-pending and commonly assigned U.S. patent application Ser. Nos. 09/874,184 and 09/924,058, cited above, the disclosures of which have been incorporated herein by reference. Modified imaging extension 18, described in more detail below, can be accessed by, for example, JAVA™ applets for accessing imaging store 30, although other web programming technologies can be used.

In some embodiments of the present invention, a preview version of the printable version of the target image is incorporated into web content 20 of accessed destination services 34, 35, including destination services 34, 35 accessed through imaging service 32 which provides links to source and destination services, and is previewed to user 100 through client program 16 in the context of the capabilities of accessed destination services 34, 35. When appropriate destination service 35 containing the predetermined symbol set is accessed, then user 100 is allowed to produce the entire target image including the controlled symbol. When user 100 selects the "print now" option, the entire production process is controlled indirectly by user 100 through client program 16.

Figure 2:
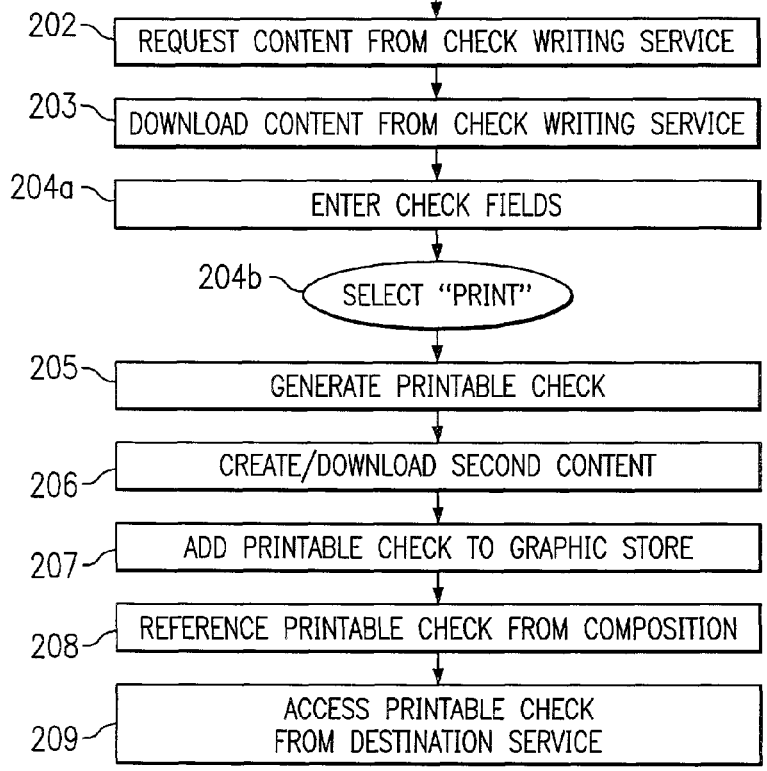
FIG. 2 is a flow diagram illustrating the operation of a check writing implementation in accordance with embodiments of the present invention.

FIG. 2 is a flow diagram illustrating the operation of a check writing implementation in accordance with embodiments of the present invention, in which the target image represents a check and the controlled symbol represents a signature or other symbol of authentication. The target image can alternatively represent any document, including a legal or financial instrument. The controlled symbol can alternatively represent any predetermined string of characters, such as alphanumeric characters including identifications numbers, sequence numbers, dates, graphic and/or geographic coordinates, reference locations, and/or gaming related characters. In some implementations the target image can contain two or more independent controlled symbols, each referencing an independent predetermined symbol set, for example a countersignature. In the present implementation the predetermined symbol set can be a signature font or alternative means of symbol mapping. Starting at block 201, client program 16 (FIG. 1C) requests at block 202 executable check writing web content 20 (FIG. 1C) from a check writing source service, e.g., source service 24, which is then downloaded into client program 16 at block 203.

Figure 3:
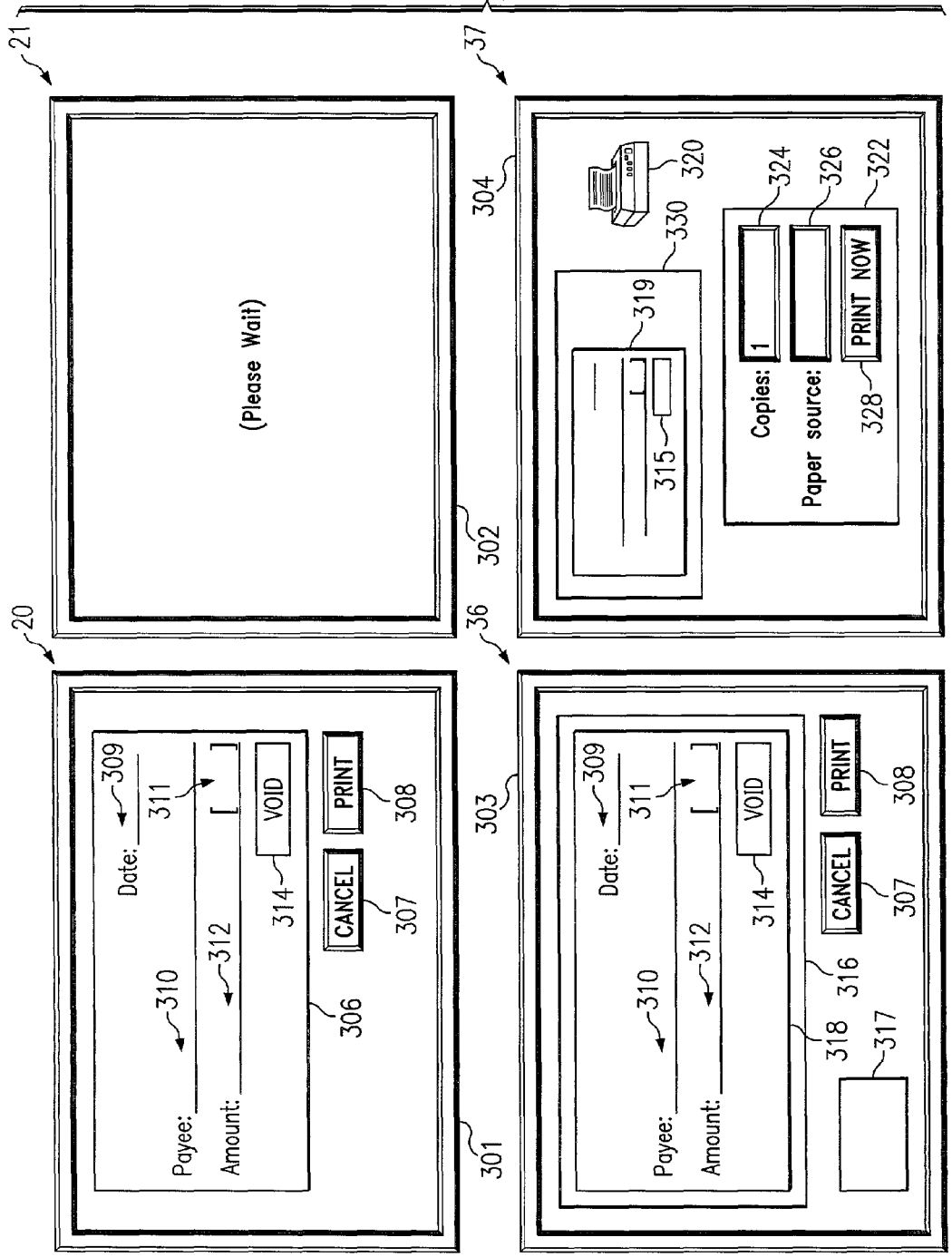
FIG. 3 is a screen view sequence illustrating an exemplary sequence of displays provided in the display window of a client program at various stages of the check writing operation depicted in the flow diagram of FIG. 2.

FIG. 3 is a screen view sequence illustrating an exemplary sequence of displays provided to user 100 in the display window of client program 16 at various stages of the check writing operation depicted in the flow diagram of FIG. 2. Screen view 301 is a display generated by executable web content 20 downloaded from check writing source service 24 into client program 16 at block 203 of FIG. 2. At block 204a, user 100 interactively enters in check image 306 the name of payee 310, amount to be paid 311, and other user accessible fields. The amount to be paid in words 312 can typically be derived logically from the user entered amount in numbers 311. Date 309 can easily be filled in automatically.

User 100 then can specify in signature field 314 a controlled signature, which refers to a predetermined signature font or other predetermined symbol set. Check writing source service 24 typically has knowledge of but does not actually contain the predetermined symbol set. A destination service can produce or display the controlled signature accurately only if the destination service contains this predetermined symbol set. Any destination service not containing the predetermined symbol set is prevented from producing or displaying the controlled signature, but in some embodiments can produce or display a substitute graphic symbol not visually recognizable as the controlled signature. This is accomplished conventionally through the process of font substitution, in which a destination service lacking the predetermined referenced signature font or other predetermined symbol set automatically defaults to a substitute font, which it then uses to produce or display a substitute graphic symbol representing the controlled signature. In some embodiments, when the destination service attempts to produce the controlled signature using a substitute, the printed signature image will convey a message that the check is void. This occurs, for example, if the graphic symbols making up the controlled signature are interpreted in the substitute font as the characters "V," "O," "I," "D," thus spelling out the message "VOID." It will be recognized by those of ordinary skill in the art that other substitution techniques are possible. For example, since check writing source service 24 does not contain the predetermined signature font or other predetermined symbol set, signature field 314 of screen view 301 reads "VOID" in response to entry of a controlled signature by user 100 through web content 20 at client program 16.

User 100 selects "PRINT" at user control 308 in web content 20 (FIG. 3) of client program 16 at block 204b (FIG. 2), whereupon source service 24 (FIG. 1C) under interactive control of user 100 through client program 16 generates a printable version of completed check 306 at block 205. Optionally, a "CANCEL" control 307 allows user 100 to discontinue check processing.

After the printable version of check 306 is generated by source service 24, it is referenced from a designated composition 40 in imaging store 30, such that it can be subsequently accessed for printing, display, or other production by destination services 34, 35. In some embodiments of the present invention at block 206 of FIG. 2, source service 24 creates an executable content 21, which is downloaded into client program 16 and displayed as depicted in screen view 302 of FIG. 3. Executable content 21 has minimal visible attributes, for example displaying simply a "please wait" message. Executable content 21 then adds the printable version of check 306 to a graphic store at block 207 and references the printable version of check 306 from a designated composition in imaging store 30 at block 208. In some embodiments, the printable version of check 306 is represented by a graphic referenced by a default composition in a personal imaging repository, which is accessed by executable content 21 through imaging extension 18 indirectly managed by client program 16. The printable version of check 306 need not be stored in a particular or even in a single physical location, but can be stored at distributed physical locations within network 10 that are logically accessible from a personal imaging repository. Moreover, the printable version of check 306 can entirely or in part be nonexistent or only hypothetically existent (i.e., virtual) prior to being dynamically generated in response to a request initiated by a client program. Conversely, the printable version of check 306 can be dynamically generated entirely or in part by addressing a Uniform Resource Locator (URL) that references preexisting data. At block 209 (FIG. 2) the printable version of check 306 is accessed by destination services 34, 35 for printing, display, or other production.

Figure 4:
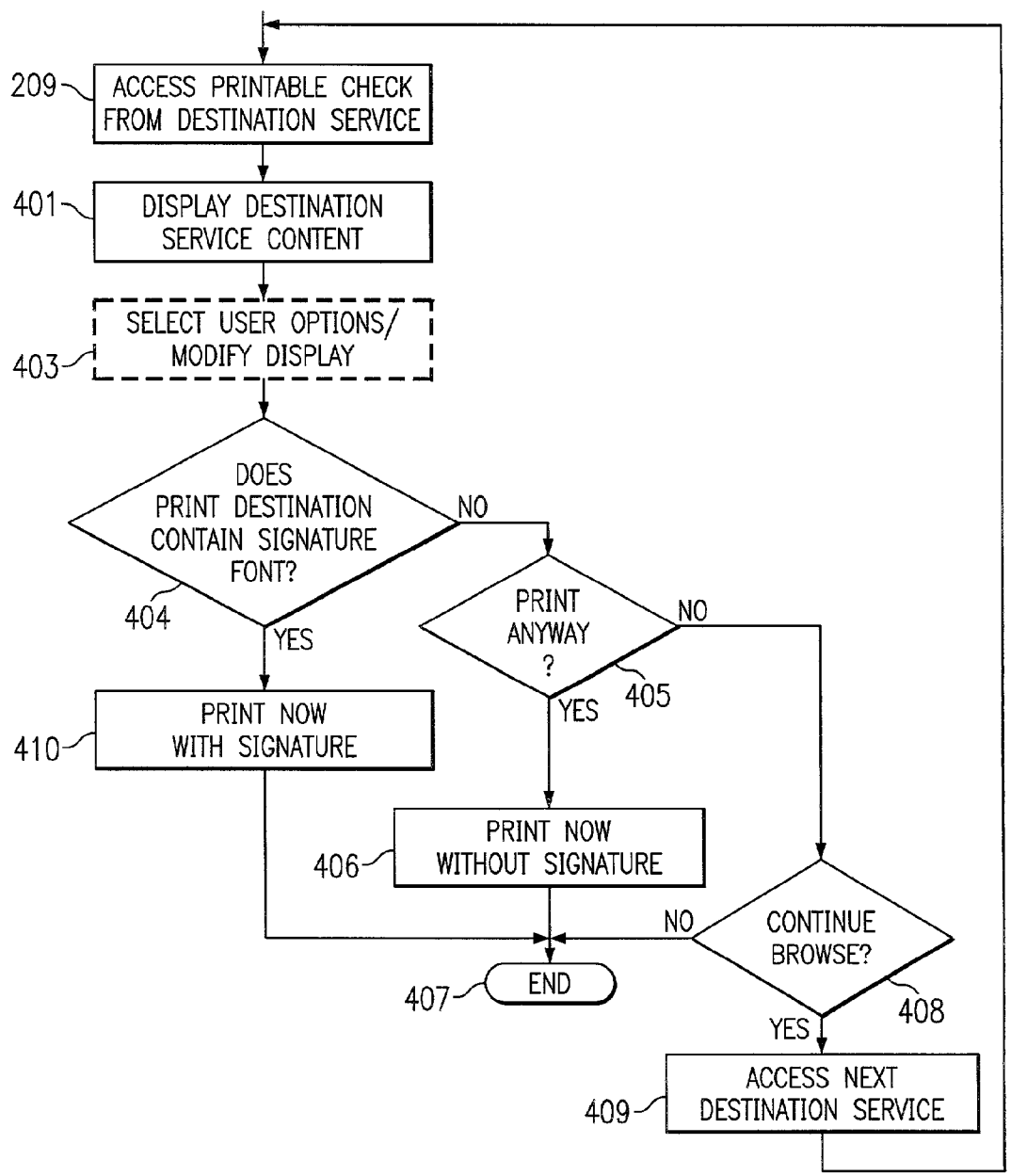
FIG. 4 is a flow diagram further illustrating the operation of a variation of the check writing in continuation of the implementation depicted in FIG. 2.

FIG. 4 is a flow diagram further illustrating the operation of a variation of the check writing implementation of the present invention, in continuation of the operation depicted in FIG. 2. At block 209 of FIG. 4 (also shown in FIG. 2) the printable version of check 306 is accessed by destination services 34, 35 for printing, display, or other production by redirecting client program 16 to a respective destination service, which then accesses designated composition 40 in imaging store 30 referencing the printable version of check 306. In some embodiments, client program 16 is forwarded by directly addressing a desired destination service via its unique URL. In other embodiments, client program 16 is forwarded to a preselected destination service 34, 35 under direction of executable content 21. These destination services can include imaging service 32 and destination services subsequently accessed via imaging service 32. In each case, the accessed destination service 34 or 35 downloads into client program 16 executable content 36 or 37 respectively. After the respective executable content 36, 37 is downloaded, then accessed destination service 34, 35 accesses designated composition referencing the printable version of check 306. In some embodiments this is accomplished through imaging extension 18 by executable content 36, 37 acting on behalf of accessed destination service 34, 35.

In some embodiments, executable content 36, 37 requests and receives a preview version of check 306 or other target image, normally a bit map image, from imaging store 30 via imaging extension 18 of client program 16. At block 401 of flow diagram FIG. 4, executable content 36, 37 then creates a display depicted respectively in screen view 303 or screen view 304 of FIG. 3. If a non-appropriate destination 34 has accessed the printable version of check 306 after downloading executable content 36 into client program 16 (in other words browsing client program to destination 34), then a display is created as depicted in screen view 303. Illustratively, screen view 303 includes window 316 in which a preview version 318 of check 306 is displayed. Preview version 18 includes depictions of fields 309-312 filled in as described in connection with block 204a of flow diagram FIG. 2. Since destination 34 is not appropriate destination 35, signature block 314 does not display an actual signature but in some embodiments only a substitute message such as "VOID," and in other embodiments a blank space. Screen view 303 includes "PRINT" and "CANCEL" controls 308 and 307 respectively and a control panel 317 providing user selectable production options, based on the capabilities of a production device 152, 154 represented by destination service 34, for example duplexing, color, stapling, and/or collating. In some embodiments the appearance of preview version 318 is altered dynamically to depict the capabilities and the user selected production options of the production device 152, 154 represented by accessed destination service 34.

If an appropriate destination service 35 has accessed the printable version of check 306 after downloading executable content 37 into client program 16, then a display is created as depicted in screen view 304. Illustratively, screen view 304 includes window 330 in which a preview version 319 of check 306 is displayed, including as in screen view 303 a depiction of filled in fields 309-312, not shown in screen view 304 for reasons of simplicity. Since destination 35 is an appropriate destination, signature block 315 optionally displays an actual signature. Alternatively, in some versions the actual signature is not displayed at all, or an optional proxy graphic symbol is displayed, affirming that an appropriate destination service 35 is accessed without displaying an actual signature. Screen view 304 includes a visualization 320 of the production device 152, 154, represented by accessed appropriate destination service 35 and a control panel 322 providing user selectable productions, for example number of copies 324, paper source 326, and a "PRINT NOW" control 328. In some embodiments screen view 304 includes additional user selectable controls as are illustrated in screen view 303, for example a "CANCEL" control and controls similar to those provided in control panel 317. Likewise screen view 303 can include a production device visualization 320. Screen views 303 and 304 are intended to be illustrative only within a wide range of layouts and control capabilities. With the exception that screen view 303 can never display the actual signature, screen views 303 and 304 can be identical in some embodiments.

Referring again to FIGS. 3 and 4, after executable content 36, 37 has created a display as depicted in screen view 303, 304 showing preview version 318, 319 in the context of accessed destination service 34, 35, then at block 403 user 100 can select production options. When user 100 selects a production option, the appearance of preview version 318, 319 dynamically changes to conform to the eventual produced target image using the user selected production option with the production device 152, 154 represented by the accessed destination service 34, 35. Alternatively user 100 can decline or defer selecting production options.

Operational flow then proceeds to block 404, where user 100 determines if the accessed destination service is an appropriate destination service 35 containing the predetermined symbol set or a non-appropriate destination service 34 not containing the predetermined symbol set, for example, a predetermined signature font. User 100 can learn the status of accessed destination service 34, 35 in any of a number of ways, including directly from the occurrence of an actual signature or a proxy symbol in signature field 314, 315, or indirectly from other indicators or prior knowledge. If an appropriate destination service 35 has been accessed, then user 100 at block 410 can select further production options as desired and select "PRINT," whereupon the target image is printed or otherwise produced including the desired signature on production device 152, 154 represented by appropriate destination service 35.

If a non-appropriate destination service 34 has been accessed, then user 100 can exercise an option at block 405 to print anyway, whereupon the target image is printed or otherwise produced at block 406 excluding the desired signature on production device 152, 154 represented by non-appropriate destination service 34. In place of the desired signature, a substitute symbol such as "VOID" can be printed or otherwise produced. If user 100 declines to print anyway at block 405, then at block 408 user 100 can exercise an option to browse to other destination services. This involves sequentially addressing the URLs of other destination services, which then sequentially download executable content (web pages) into client program 16. In some embodiments this process is implemented through a web service such as imaging service 32, which for example can pre-sequence the destination services to be accessed. User 100 accesses a next destination service 34, 35 at block 409. Each time that user 100 accesses a next destination service, operational control returns to block 209 of FIG. 4 (also shown in FIG. 2), where the printable version of check 306 is accessed by the new destination service.

For each sequentially accessed destination service the appearance of preview version 318, 319 displayed at block 401 dynamically changes to conform to the eventual produced target image using the user selected capabilities of the production device 152, 154 represented by the next accessed destination service 34, 35. The cycle repeats through blocks 403 and 404 until user 100 terminates the process at block 407, prints without the signature, or succeeds in accessing appropriate destination service 35 and printing the image complete with the signature.

As suggested above, various graphic and imaging stores, source and destination services, and/or other functionality involved in certain embodiments and implementations of the present invention need not be localized either individually or collectively, but can be distributed throughout network 10. Conversely, in some embodiments certain functionalities can be combined or integrated. Illustratively a source service can be combined with a destination service, for example appropriate destination service 35, onto a common server machine. Similarly, in some embodiments source service and/or destination service can run on the same PC with client program 16.

Broadly stated, the present invention is directed to a system and method for printing, producing, and/or display of a controlled image represented by a set of data in a distributed computing environment such as a network. The image, representing for example a check or other document, includes a predetermined graphic symbol, which can represent a signature or other symbol of authentication, which references a predetermined symbol set such as a signature font. Alternatively, the predetermined graphic symbol can represent a string of characters, as found for example in codes. This set of data is dynamically generated by a source service such as a web-based check writing service at the request of the client program, and graphically reflects that the signature is void, but also includes information referencing the signature along with information authenticating the signature. When this set of data is accessed generally by web-based imaging applications, such as destination services representing printing, display, or other production devices, it appears to represent a void signature. However, when this set of data is accessed by a web-based imaging application containing the referenced symbol set, the actual signature is mapped onto the displayed and/or printed image. The web-based imaging application determines this by requesting the predetermined graphic symbol individually in its symbol form (versus in the form of general two dimensional graphics).

Embodiments of the present invention provide for image generation, display, production, and storage in distributed parts of a network under remote indirect control from a client program such as a web browser through executable content accessed from distributed source and destination web services and operating through an imaging extension of the web browser. In particular the various distributed web services through the client imaging extension access an imaging store associated with a particular user ID, which can also be distributed through the network and which references a particular stored controlled image from a particular composition stored in a composition store of the imaging store. The set of image data is referenced to the imaging store after generation, and can then be accessed by destination services, including an appropriate destination service containing the predetermined symbol set and having the capability to print or produce the controlled image accurately including the signature. Alternatively, any combination of said services, clients, and imaging stores can run on a single host machine.

In some embodiments of the present invention, an accessed destination service requests a preview version of the image from the imaging store, and provides an executable content that is displayed at the client program (browser) including user selectable options specific to the production service (e.g., printer) represented by the accessed destination service and a dynamically changing image of the preview version in the context of the capabilities specific to the production device as selected by the user through the content provided in the browser display. In the latter case, if the accessed destination service does not contain the predetermined symbol set, the displayed or printed image cannot include the controlled signature but can instead display a "VOID" message. If the accessed destination service is an appropriate destination service containing the predetermined symbol set, the controlled signature can be displayed. Alternatively, the appropriate destination service can either display the printable image without the controlled signature, or a "VOID" message, or a recognizable proxy symbol signifying the presence of the predetermined symbol set without revealing the actual signature.

The system and method provide printing from a web application that is independent of the configuration of the operating system. In addition, since the print destination server can return with specific print content that relates to a selected device, the present invention allows a preview of the print job in the context of the devices and/or services offered by the print destination server.

Figure 5A:
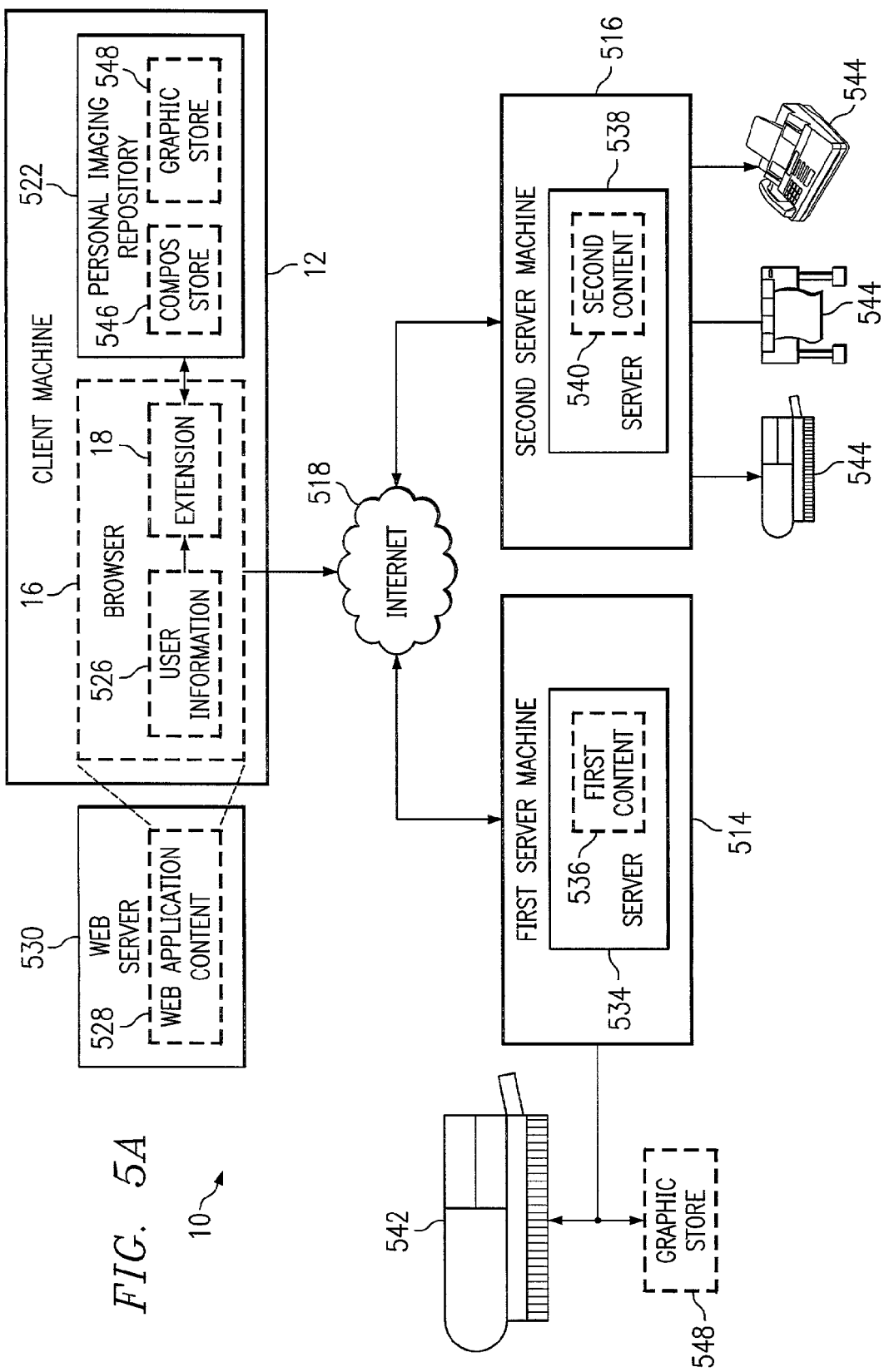
FIG. 5A is a schematic diagram depicting a client-server network system in accordance with embodiments of the present invention.

FIG. 5A is a schematic diagram depicting client-server network system 10 in accordance with embodiments of the present invention. Client machine 12 is connected to first server machine 514 and second server machine 516 via Internet 518. Client machine 12 includes client program (browser) 16 and preferably personal imaging repository 522. Browser 16 further includes extension component (imaging extension) 18 that makes use of user information 526 in order to provide an interface between content executing in browser 16 and personal imaging repository 522. More specifically, user information 526 is used for associating accesses through extension component 18 with the appropriate user's personal imaging repository. It should be noted that the user profile can associate different users or groups with personal imaging repository 522. For example, the user profile can associate a single user with a particular personal imaging repository, but, at the same time, this user can also have multiple user profiles, resulting in multiple personal imaging repositories associated with a single user. Similarly, the user profile can associate a group having multiple users with a particular personal imaging repository. A personal imaging repository, in this scenario, can be used by a group having a common association, such as a group project. As described, the user profile can be defined with great discretion and flexibility, and the above implementations are contemplated and within the scope of the present invention.

Although the preceding description defines the user profile broadly, it should be understood that in the present embodiment each user has one personal imaging repository. A personal imaging repository will not typically be associated with groups—it will typically be associated only with individuals, but could optionally allow several individuals to use the same repository. This personal imaging repository is defined by all the information and services that are relevant to performing imaging operations for the particular user. The "root" of a user's personal imaging repository is one or more user profiles, which are associated with the user through one or more sets of user information. The present invention is directed to implementing the concept of allowing a user's information to follow him/her around, i.e., be accessible from a variety of different locations, both inside a firewall and outside of the firewall, as well as from a variety of different machines.

Imaging extension 18 is configured to respond to the execution of generic access instructions from web application content 528 by generating/mapping these generic instructions to corresponding imaging client-specific commands of imaging client 16. However, this will happen only if user information 526 (containing references to the user's profiles) is available to imaging extension 18, to access the user's personal imaging repository 522.

Imaging extension 18 can be regarded and implemented as an application programming interface (API). The API used for imaging extension 18 is preferably structured in accordance with a system wide standard. The generic access instructions for example from web application content 528, when executed, can cause imaging extension API calls to be issued to the API in order to access the user's personal imaging repository 522 via imaging client-specific instructions. It will be recognized by those of ordinary skill in the art that there are other ways (both hardware and software) to implement this same functionality. Embodiments of the present invention are not limited to any one way. In essence, imaging extension 18 provides means for accessing user information 526 and for providing an opaque interface between web application content 528 executing in browser 16 and personal imaging repository 522 and other functionalities of imaging client 16. An example implementation of the imaging extension will be discussed in more detail below.

In operation, browser 16 initially accesses a web site and using appropriate request commands (HTTP for the current generation of browsers), downloads web application content 528 therefrom, which includes a set of executable instructions intended to be executed in browser 16 to provide browser 16 with predetermined functionality. These executable instructions comprise generic access instructions (see definition above), which are system wide instructions expressed in some language (i.e., JAVA™), that call the resources of an imaging extension API to access the user's personal imaging repository 522 to perform web imaging operations. Such generic access instructions can be, by way of example but not by way of limitation, JAVA™, JavaScript™, and C-sharp instructions. A system wide standard preferably manifested as an API or set of APIs typically specifies "generic access instructions," "generic access requests," and "target graphics."

A variety of functionality can be provided by web application content 528 including, for example, executable instructions for imaging client 16 to display target graphics, i.e., show available graphics on the accessed web site. Another web application content can include executable instructions for displaying a print button, and if the print button is clicked, causing imaging client 16 to generate a print job that describes a graphic in the personal imaging repository 522 of the user and to transmit the print job, for example, to printer 542. A web application content can also provide a preview of the target graphic. Accordingly, web application content 528 refers to a set of executable instructions that are downloaded into browser 16 to perform a service requested by the user.

Browser 16 executes web application content 528, whether it is HTML interpreted and/or executed by browser 16 into marks displayed on a user's display, or JAVA™ and JavaScript™ or some other appropriate language. As previously noted, web application content 528 contains executable instructions that use the API provided by imaging extension 18 to indirectly access the user's personal imaging repository 522. For example, the executable instructions of the web application content can obtain an opaque access to the information from the user's profile (in order to specify the user's personal imaging repository) by interacting with a user profile store service (not shown).

In the discussion herein, the term "opaque reference" is used. An "opaque reference" is a reference that does not expose information about an underlying resource. The possessor of an opaque reference is unable to determine anything about the resource from the opaque reference or to modify the opaque reference so as to alter which resource is being referenced. (In contrast, if a URL is provided, for example, "http://www.hp.com", it would be fairly straightforward for the web application content to modify the URL to refer to a different resource, for example, "http://www.other.com".)

The executable instructions of web application content 528 perform this access to obtain an opaque reference to the user's composition store 546 and graphic store 548. The web application content can further use the API provided by imaging extension 18 to add a new graphic to graphic store 548 via opaque reference.

Imaging extension 18 is configured to prevent web application content 528 (i.e., the executable instructions from web service 530), from directly accessing arbitrary services and the user's personal imaging repository 522. In essence, web application content 528 uses imaging extension 18 as a gateway to access everything in the user's personal imaging repository 522, including the information in the user profile.

This restricted access imposed on web application content 528 can be implemented using a variety of methods. The designer can implement the API for imaging extension 18 such that the API only accepts references from web application content 528 that were previously provided thereto by imaging extension 18. In essence, web application content 528 is then unable to supply references arbitrarily when calling the API provided by imaging extension 18. Web application content 528 running on imaging client 16, in order to communicate with imaging client resources and with user's personal imaging repository 522, must first obtain opaque references using the API of imaging extension 18. For example, if web application content 528 wants to access graphic store 548, web application content 528 is required to call a method (provided by the API of the imaging extension 18) that provides an opaque reference to graphic store 548. This reference can then be used in subsequent calls by web application content 528 to the API of imaging extension 18.

One approach to accomplishing this restriction is to create a session. For example, an imaging extension API for a particular operation might comprise:

CreateParticularOperationSession( ): returns SessionID

PerformOperation(Parameter, SessionID id): returns Boolean (which indicate a result)
DeleteParticularOperationSession (SessionID)

Accordingly, web application content 528 is required to call the imaging extension API to first create a session by calling CreateParticularOperationSession, which returns a SessionID. This SessionID is subsequently used to refer to the particular session. Next, web application content 528 calls the PerformOperation in the imaging extension API with particular input and the SessionID. Web application content 528 can perform a variety of manipulations, but cannot directly access parameters and operations which are "associated" with the SessionID, because the association is accomplished in a way that is "opaque" to the client. The imaging extension API and that API alone knows how to use the SessionID to determine/map to imaging client parameters. Often, the SessionID will be a reference such as a pointer to a data structure containing information relevant to the session. This data structure can contain parameters and other pertinent information. When web application content 528 has completed its operation, web application content 528 calls DeleteParticularOperationSession in the imaging extension API with the SessionID as a parameter. This instructs the imaging extension API to free whatever resources (such as memory) are associated with the session. Note that if web application content 528 changes the SessionID, that will not allow web application content 528 to obtain restricted parameters, but will only confuse imaging extension 18 with the changed previously unseen SessionID.

The API provided by imaging extension 18 is typically implemented as a library of methods that provide controlled access to an API provided by the network services participating in user's personal imaging repository 522. This API is implemented to invoke the API provided by the user profile store, composition store 546, and graphic store 548. The API provided by imaging extension 18 is generally not accessed through remote invocation technology, although remote invocation technology can be implemented to access the APIs provided by the network services participating in the user's personal imaging repository 522. The API provided by imaging extension 18 is not an exact replication of APIs provided by the user profile store, composition store, and graphic store, since this API provides controlled access to those network services through (among other techniques) opaque references.

From the above description, it can be seen that web application content 528 is prevented from using the API provided by imaging extension 18 to access arbitrary services. The key to this restriction is that web application content 528 cannot supply the addresses for these arbitrary services. Web application content 528 can only refer to services through opaque references provided by the imaging extension API (not exposing the actual reference/URL to web application content 528). For example, web application content 528 can use the API to obtain a list of opaque references to available compositions. This list of opaque references instead would map to the real references/URLs in imaging extension 18, alone. Thus, in subsequently referring to these compositions, web application content 528 cannot supply a URL (which might be one of its own creation), because that created URL cannot map within imaging extension 18 to real resources. Instead, web application content 528 is required to use only references provided to it by the API, which make sense only in the context of the current session with that API. This restriction can be relaxed in circumstances where web application content 528 provides references to resources available from the same network service in which web application content 528 originated. This is permitted, because web application content 528 already has a measure of access to the web service from which it originated (either when originally generated or subsequently), thus not acquiring any special access not already available to web application content 528.

Browser 16 uses web application content 528 that is provided by web server 530. When the user selects "print" in the web application content, web application content 528 among other things directs browser 16 to the print destination. Although one client machine 12 and two server machines 514, 516 are shown as examples, a broader implementation can involve multiple server machines to which client machine 12 has access and can communicate. For better readability, a single client machine, server, production device, e.g., printer, or application has been and will be referred to and shown herein. However, it should be understood by showing only one or by the use of "a" that what is meant is "one or more". For example, although a single printer has been and will be described and shown, this printer may actually be a plurality of printers forming a printing resource. In such a situation, it is understood that the present inventive concepts apply.

First server machine 514 includes first server 534. When browser 16 is directed to first server 534 addressed by a unique Uniform Resource Locator ("URL"), first content 536 is served by the first server to browser 16. Each content 536 is preconfigured with specific instructions depending on the type of service the server machine represents. Similarly, second server machine 516 includes a second server 538 with a second content 540. Generally, the contents 536, 540 are different, because the services and/or access to devices provided by the servers are different. In FIG. 5A, first server machine 514 is connected to single printing device 542, whereas second server machine 516 serves multiple printing devices 544. Consequently, first content 536 and second content 540 are different from one another, each including separate instructions to browser 16.

Although it is shown that the servers represent only printing devices in this example, the server can represent other services. For example, the server can be an auction web site, such as ebay.com, which makes an auction page for the user when a graphic file is printed to the web site, or a check writing service. In embodiments of the present invention, the user can "print" to any one of many services. As a result, the use of the word "print" is intended to have a broad definition, which can be applied to many available devices or services. Whatever the services and/or device the servers provide, the content can include the instructions needed for the configuration. It is advantageous that a personal imaging repository 522 be implemented according to the present invention, to store data that can be accessed by these servers.

In the present embodiment, personal imaging repository 522 includes composition store 546 for storing composition(s) of the imaging data that are serviced as a single unit and an graphic store 548, i.e., digital memory, for storing the imaging data. An imaging composition generally comprises links to the imaging data (also known as graphics), which can be located at another service or services. Accordingly, composition store 546 stores only the imaging compositions. Graphic store 548, on the other hand, is any imaging data store located on any computer that contains the graphics. More specifically, each web service can have its own graphic store 548 available to the public.

For example, at some earlier time a user can print an article from a web service site, resulting in an imaging composition being created and stored in the user's composition store 546. The imaging composition contains only the link to the graphic for this article stored for example on first web service site 514. Consequently, the graphic for the article is not in the graphic store 548 located on client machine 12. Rather, the graphic is stored in a graphic store 548 located on web service site 514. Users will have a graphic store 548 that belongs to their user identification, where they can store imaging data, which is graphic store 548 shown in client machine 12. As a result, the term "personal imaging repository" 522 is a conceptual term for an exchange infrastructure between the imaging data and the available web services on Internet 518. Similarly, the term "web" denotes millions of distinct servers that comprise the web. However, the web does not actually do anything itself. In embodiments of the present invention, the servers serving composition store 546 and graphic store 548 are physical implementations of the personal imaging repository as a concept.

It should be noted that personal imaging repository 522 can represent any type of data storage device. In fact, the data storage device of personal imaging repository 522 does not necessarily have to be located with client machine 12. Personal imaging repository 522 can be located, for example, on another machine or segmented and distributed among multiple machines, which client machine 12 can access through Internet 518. Although it is frequently advantageous to include personal imaging repository 522 with client machine 12, this can change as data rates become faster and the popularity of personal digital assistant ("PDA") devices increases. These alternative implementations are considered to be within the scope of the present invention.

Figure 5B:
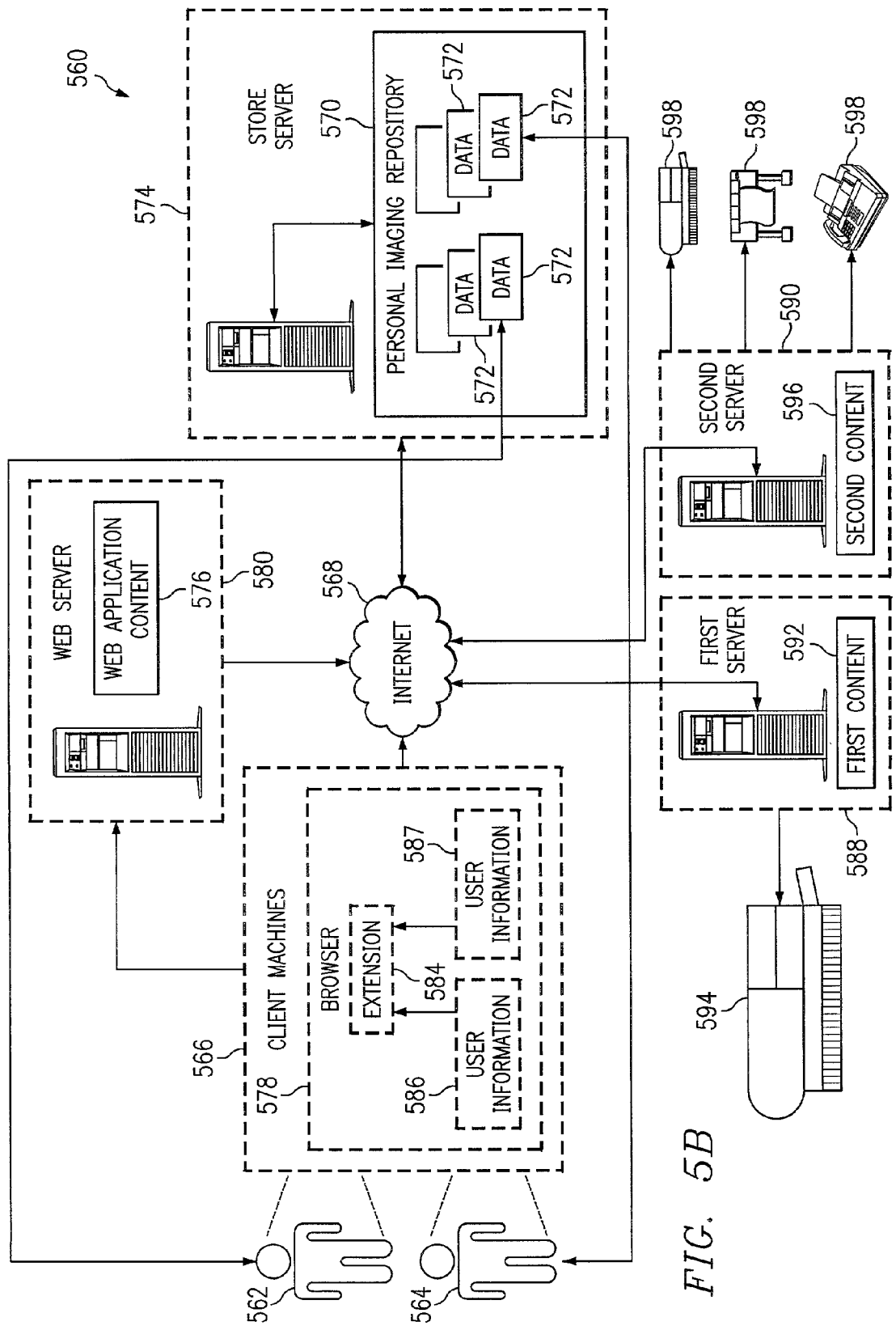
FIG. 5B is a schematic diagram depicting a variation of the client-server network system of FIG. 5A, which is tailored to faster data rates or limited client machine storage capacity

FIG. 5B is a schematic diagram depicting a variation 560 of the client-server network system of FIG. 5A, which is tailored to faster data rates or limited client machine storage capacity. In this implementation, multiple users 562, 564 utilize the same client machines 566 through Internet 568. In this implementation, client machines 566 can include client computers that have less storage memory, such as a Personal Digital Assistant ("PDA") or a laptop. Because of limited storage memory, personal imaging repository 570 for storing user's data 572 is located on a separate computer 574, which can be a server computer or just a linked client machine 566. In this example, separate computer 574 is a server, which will be herein referred to as store server 574 to distinguish it from other servers for printing. Users 562, 564 are assigned distinct user profiles (not depicted explicitly in FIG. 5B) for accessing personal imaging repository 570 through store server 574. The user profile (or profiles) is part of the user's personal imaging repository. Users 562, 564 each have a distinct personal imaging repository, although only a single personal imaging repository 570 is depicted explicitly in FIG. 5B. Although not shown, personal imaging repository 570 can similarly be implemented with a composition store and a graphic store, where user's data 572 can be stored. User's data 572 is broadly interpreted to include one or more user profile store services, one or more composition store services and/or one or more graphic store services.

In operation, a first user 562 initially accesses system 560 with a login name and password. Once first user 562 has accessed system 560, the first user then also has access to the personal imaging repository 570 that is linked to this first user's login name. Similarly, if a second user 564 logs in with a login name and password, the second user has access to system 560, including the personal imaging repository 570 that belongs to this second user's login name. In this implementation, users can access system 560 and their personal imaging repository 570 from any computers that have a browser and Internet access. As a result of the flexibility of the Internet, it is possible for users to access system 560 and their personal imaging repository 570 using a standard PDA and/or wireless web phone.

Web application content 576 can be used by the users through a browser 578 that is located on client machine 566. Similar to the previous implementation, web application content 576 is provided through web server 580. Browser 578 also contains extension 584 for accessing user information 586, 587 that associate the different user profiles assigned to users 562, 564 with their respective personal imaging repositories. User information is different from a user profile. User information references one or more user profiles associated with a particular user. As shown, each user profile has its own user information. Alternatively, the user information can also contain information for two or more user profiles. These other variations are contemplated and are within the scope of the present invention.

Users can access a variety of servers on the Internet for the printing of the target data from web application content 576. In this example, there is first server 588 and second server 590. First server 588 provides first print content 592 representing single printing device 594, and second server 590 provides second print content 596 representing a plurality of printing devices 598.

Upon the user selecting PRINT or PRINT PREVIEW from web application content 576, web application content 576 first directs browser 578 to request a specific URL, which references a web page located on web server 580. Shown as an example in FIG. 5B, a user creates a document using web application content 576, and from web application content 576 the user can elect to PRINT the document (i.e., the target data).

In response to receiving the request for the web page specified by the aforementioned URL, web server 580 constructs an imaging data of the target data. An imaging data refers to the printed output of the target data, which does not necessarily look the same as the target data, depending on the behavior of web application content 576. This step of constructing an imaging data may not be necessary, and depends on the implementation and configuration of the print destination. For example, if sending a graphic file to the earlier example of an auction site for making an auction page with the graphic file, an imaging data might not have to be generated. Instead, print destination server 588, 590 can accept the target data without further modification for compatibility. However, since it is hard to foresee what type of graphic files the web site will accept, the exemplary method is implemented with the intermediate step of constructing imaging data to guarantee uniformity and compatibility. Formats for the imaging data include JPEG, Graphics Interchange Format ("GIF"), Portable Network Graphics Format, Tagged Image File Format ("TIFF"), PDF and Microsoft Windows bitmap format ("BMP").

After web server 580 constructs the imaging data for the target data, web application content 576 transfers the imaging data to personal imaging repository 570. It is then determined whether personal imaging repository 570 is located on client machine 566 or on store server 574. If personal imaging repository 570 is located on the client machine 566, the imaging data is saved to personal imaging repository 570 without further connection. If, however, personal image repository 570 is located on store server 574, client machine 566 will connect to store server 574. It is then determined whether the connection is successful before a timeout, and client machine 566 will keep trying to connect to store server 574 until a timeout or successful connection occurs. Once the connection with store server 574 is successful, client machine 566 transfers the imaging data to store server 574 for storage in personal imaging repository 570.

After the imaging data is stored in personal imaging repository 570, web application content 576 directs browser 578 to the server indicated by print destination 594, which will be referred to as print destination server 588. It is next determined whether print destination server 588 is available for printing. An error message is sent to browser 578 if the print destination server 588 is not available. If, on the other hand, print destination server 588 is available, it will respond to browser 578 by returning a print content 592, which will be displayed on browser 578 for user configuration. Print content 592 is generally a web page that is designed according to the services that this print destination provides. Furthermore, there are a number of ways to implement print content 592, depending on the services available. For example, print content 592 can be configured to display a list of imaging data stored in personal imaging repository 570. In this scenario, print content 592 accesses personal imaging repository 570 to obtain the list for display to the user. The above described variations are contemplated and should be considered within the scope of the present invention.

As an example, if print destination server 588, 590 represents multiple printing devices, a page of the print application content may contain all the printing devices 594, 598 that are available for user selection. From this page of the print content the user selects a printing device, and another page is returned to the user with the imaging data and the configurations that are available for this particular printing device. Through the print content, the user is able to print or print preview the imaging data according to the configurations of printing devices 598. In the auction site example, users can preview the auction page that they configured before posting onto the auction list. As shown, the print content can be returned with multiple pages depending on the need of the services provided by the print destination server.

Once the user-selected configuration is finalized, the user can then select to PRINT or PRINT PREVIEW from print content 592. Print content 592 accesses the imaging data from personal imaging repository 570, and transfers the imaging data with the specified user configuration to print destination server 588, through which the imaging data is printed or displayed according to the specified configurations including selected printing device 594. At the end, the print content can return a status page to indicate successful output at the printing device.

Personal imaging repository 570 is an example of the notion of "identity." The user has a network "identity" through which he/she is represented. Personal imaging repository 570 contains information associated with the user's identity. The foregoing description addresses a computing environment in which imaging extension 584 is used to make user information available to web content 592, 596 downloaded into browser 578. Imaging extension 584 makes information associated with the user's identity available. The primary purpose of imaging extension 584 is to provide access to information that is identified by user specific information 586, 587. In essence, this is a client-side approach to identifying user information.

Although it is possible to extend browsers on Windows operating systems, it becomes harder to do this for newer devices like PDAs. Consequently, it is desirable to support the notion of identity without requiring the browser to be extended. Alternatively, a server-side approach to identifying user information is possible. This can be accomplished by moving the logic normally present in web content 592, 596 running within browser 578 into web server 588, 590. Rather than web content 592, 596 accessing services specific to the user, web server 588, 590 directly accesses services specific to the user. In other words, the identity technology is server side instead of client side.

When using server side identity technology, because browser 578 no longer provides information regarding a user's identity, an "authentication website" can be used to provide such information. In such an arrangement, web content 592, 596 redirects browser 578 to the authentication website, which determines the identity of the user and then redirects browser 578 back to the web content 592, 596 with the user identity, including the location of the user's profile. For this purpose, it is assumed that all web imaging destinations have information regarding the authentication server. Once the user's identity is determined (i.e., the location of the user's profile is known), then web imaging destination can interact directly with services specific to the user, without intervention of imaging extension 584.

What is claimed is:

1. From a client program in a web-based environment, a method for controlling production and display of an image represented by data generated at a source service, said data representing at least in part a predetermined graphic symbol referencing a particular symbol set, said method comprising the steps of:
    accessing said source service;
    dynamically generating a printable version of said image represented by said data at said source service wider interactive control of said client program, said printable version including said predetermined graphic symbol referencing said particular symbol set;
    referencing said printable version of said image represented by said data from a composition stored in an imaging store;
    accessing said composition from a destination service; and
    if said destination service contains said particular symbol set and if said destination service is instructed to produce said printable version of said represented image, then forwarding said printable version of said represented image to said destination service and then producing said represented image including said predetermined graphic symbol under interactive control by said client program, wherein said particular symbol set identifies mapping characteristics for producing said predetermined graphic symbol on said represented image.

2. The method of claim 1 wherein said represented image comprises a document.

3. The method of claim 2 wherein said document is selected from the group consisting of legal instruments, financial instruments, governmental instruments, money orders, wills, and checks.

4. The method of claim 1 wherein said predetermined graphic symbol comprises a symbol of authentication.

5. The method of claim 4 wherein said symbol of authentication comprises at least one signature.

6. The method of claim 1 wherein said particular symbol set is a font.

7. The method of claim 1 wherein said predetermined graphic symbol comprises a predetermined string of characters.

8. The method of claim 7 wherein said predetermined string of characters comprises a string of alphanumeric characters selected from the group consisting, of identification numbers, sequence numbers, dates, graphic coordinates, geographic coordinates, and codes.

9. The method of claim 1 wherein, if said destination service does not contain said particular symbol set and if said destination service is instructed to produce said printable version of said represented image, then producing said represented image excluding said predetermined graphic symbol.

10. The method of claim 9 wherein, if said destination service does not contain said particular symbol set and if said destination service is instructed to produce said printable version of said represented image, then producing a substitute graphic symbol in place of said predetermined graphic symbol by using a substitute symbol set.

11. The method of claim 1 wherein said printable version of said represented image does not exist prior to said dynamically generating at said source service under interactive control of said client program.

12. The method of claim 1 wherein a web content acting on behalf of an accessed destination service generates a display at said client program comprising controls that include user selectable production options and a preview version of said represented image based upon said user selected options and upon the capabilities of a production device represented by said accessed destination service.

13. The method of claim 12 wherein said production device comprises a print destination, wherein said web content is an executable content acting on behalf of said accessed destination service representing said print destination, and wherein said preview version of said represented image sequentially changes dynamically, based upon the capabilities of print destinations sequentially accessed through multiple destination services, prior to forwarding said printable version of said represented image to a destination service.

14. The method of claim 12 wherein said preview version changes dynamically, dependent on interactive user control settings at said client program.

15. The method of claim 12 wherein said predetermined graphic symbol is displayed only when said client program accesses a destination service that contains said particular symbol set.

16. The method of claim 12 wherein said predetermined graphic symbol is not displayed.

17. The method of claim 16 wherein, if said client program accesses a destination service that contains said particular symbol set, a proxy graphic symbol is displayed in place of said predetermined graphic symbol, said proxy graphic symbol when displayed providing affirmation that said particular symbol set is contained in said destination service.

18. The method of claim 12 wherein said preview version of said image is retrieved by said accessed destination service from said imaging store.

19. The method of claim 12 wherein said client program accesses said destination service using an access technique selected from the group consisting of redirection by a second executable content and directly addressing said destination service via a Uniform Resource Locator (URL).

20. The method of claim 19 wherein said client program accesses said imaging store via said second executable content.

21. The method of claim 1 wherein said printable version of said represented image is stored in a graphic store associated with said imaging store and managed indirectly from said client program.

22. The method of claim 1 wherein said imaging store is associated with a user's identity.

23. The method of claim 22 wherein said user's identity is accessed by an executable content acting on behalf of said destination service.

24. The method of claim 22 wherein said user's identity is accessed directly by said destination service.

25. A system for controlling printing and display of an image in a distributed computing environment, comprising:
- a first computer;
- a second computer accessible from said first computer and operable to provide a first executable content to said first computer in response to a request from said first computer,
- said second computer further operable to dynamically generate and display a printable version of data representing said image under the interactive control of said first computer via said first executable content, said represented image comprising at least in part a predetermined graphic symbol referencing a particular symbol set;
- an imaging store accessible from said second computer and operable to access and store a composition referencing said printable version of said data; and
- at least one destination computer accessible from said first computer and operable to access said composition, said destination computer representing a production device, such that, if said at least one said destination computer contains said particular symbol set, then said production device represented by said at least one said destination computer is operable to produce said represented image including printing said predetermined graphic symbol under interactive control of said first computer, wherein said particular symbol set identifies mapping characteristics for producing said predetermined graphic symbol on said represented image.

26. The system of claim 25 wherein said represented image comprises a document.

27. The system of claim 26 wherein said document is selected from the group consisting of legal instruments, financial instruments, governmental instruments, money orders, wills, and checks.

28. The system of claim 25 wherein said predetermined graphic symbol comprises at least one signature and wherein said particular symbol set is a font.

29. The system of claim 25 wherein said second computer comprises said first computer.

30. The system of claim 25 wherein said second computer comprises said destination computer.

31. The system of claim 25 wherein said first computer comprises said destination computer.

32. The system of claim 25 wherein said imaging store is associated with a graphic store configured to receive and store said printable version of said data, said first computer operable to manage indirectly said imaging store and said graphic store.

33. The system of claim 25 wherein said at least one said destination computer is operable to access said printable version of said data in said imaging store.

34. The system of claim 33 wherein said imaging store is associated with a user's identity.

35. The system of claim 34 wherein said at least one said destination computer is operable to access said user's identity using a process selected from the group consisting of directly accessing and accessing via executable content running in said first computer.

36. The system of claim 25 wherein, if said at least one said destination computer does not contain said particular symbol set, then said production device represented by said at least one destination computer is operable to produce said represented image only excluding said predetermined graphic symbol.

37. The system of claim 33 further comprising means for displaying a preview version of said printable version of said data accessed from said imaging store, such that said preview version is based sequentially upon the capabilities of said at least one said production device represented by said at least one said destination computer, dependent on interactive user control settings at said first computer.

38. In a distributed computing environment, a computer for controlling production and display of an image represented by data generated at a source service, said data representing at least in part a predetermined graphic symbol referencing a particular symbol set, said computer operable to:
- access said source service;
- interactively direct said source service to dynamically generate a printable version of said represented image, said printable version including said predetermined graphic symbol referencing said particular symbol set;
- reference said printable version of said represented image via a composition stored in an imaging store;
- access a destination service; and
- if said destination service contains said particular symbol set, then interactively directing said destination service exclusively to access and produce said printable version of said represented image, including said predetermined graphic symbol, wherein said particular symbol set identifies mapping characteristics for producing said predetermined graphic symbol on said represented image.

39. The computer of claim 38 wherein said represented image comprises a document.

40. The computer of claim 39 wherein said document is selected from the group consisting of legal instruments, financial instruments, governmental instruments, money orders, wills, and checks.

41. The computer of claim 38 wherein said predetermined graphic symbol comprises a symbol of authentication.

42. The computer of claim 41 wherein said symbol of authentication comprises at least one signature.

43. The computer of claim 34 wherein said particular symbol set is a font.

44. The computer of claim 38 further operable, if said destination service does not contain said particular symbol set, to interactively direct said destination service to access and produce said printable version of said image excluding said predetermined graphic symbol.

45. The computer of claim 44 further operable, if said destination service does not contain said particular symbol set, to interactively direct said destination service to access and produce said printable version of said image, wherein a substitute graphic symbol is produced in place of said predetermined graphic symbol by using a substitute symbol set.

46. The computer of claim 38 further operable to interactively direct said destination service to generate at said computer a display comprising controls that include user selectable production options and a preview version of said image based upon said user selected options and upon the capabilities of a production device represented by said destination service.

* * * * *

UNITED STATES PATENT AND TRADEMARK OFFICE
CERTIFICATE OF CORRECTION

PATENT NO. : 7,970,853 B2  
APPLICATION NO. : 09/981392  
DATED : June 28, 2011  
INVENTOR(S) : Shell S. Simpson It is certified that error appears in the above-identified patent and that said Letters Patent is hereby corrected as shown below:

In column 21, line 27, in Claim 1, delete "wider" and insert -- under --, therefor.

In column 21, line 62, in Claim 8, delete "consisting," and insert -- consisting --, therefor.

In column 23, lines 6-7, in Claim 25, delete "computer," and insert -- computer; --, therefor.

Signed and Sealed this
Twenty-second Day of November, 2011

David J. Kappos
*Director of the United States Patent and Trademark Office*